(12) United States Patent
Holle et al.

(10) Patent No.: US 6,983,740 B2
(45) Date of Patent: Jan. 10, 2006

(54) INTERNAL COMBUSTION ENGINE FOR A MOTOR VEHICLE

(75) Inventors: Michael Holle, Wurmberg (DE); Franz Pulinna, Kernen (DE)

(73) Assignee: Daimler Chrysler AG, Stuttgart (DE)

( * ) Notice: Subject to any disclaimer, the term of this patent is extended or adjusted under 35 U.S.C. 154(b) by 0 days.

(21) Appl. No.: 10/930,270

(22) Filed: Aug. 31, 2004

(65) Prior Publication Data
US 2005/0051146 A1  Mar. 10, 2005

Related U.S. Application Data

(63) Continuation-in-part of application No. PCT/EP03/01953, filed on Feb. 26, 2003.

(30) Foreign Application Priority Data
Mar. 1, 2002  (DE) ................ 102 09 167

(51) Int. Cl.
F02M 25/07  (2006.01)

(52) U.S. Cl. ............... 123/568.18; 123/568.1

(58) Field of Classification Search ............ 123/2, 123/41.31, 41.42, 195 R, 195 A, 195 C, 123/568.11, 568.17, 568.18; 60/278, 379; 267/136, 140.11; 180/300
See application file for complete search history.

(56) References Cited

U.S. PATENT DOCUMENTS

| | | | |
|---|---|---|---|
| 6,499,441 B2 * | 12/2002 | Suzuki ................. 123/2 |
| 6,659,051 B2 * | 12/2003 | Shiomi et al. ........ 123/41.42 |
| 6,834,634 B2 * | 12/2004 | Lawrence ............. 123/195 A |
| 6,871,699 B1 * | 3/2005 | Boyd et al. ........... 123/41.31 |
| 6,878,347 B2 * | 4/2005 | Haga et al. ........... 60/278 |
| 2004/0256777 A1 * | 12/2004 | Yamada et al. ....... 267/140.11 |

FOREIGN PATENT DOCUMENTS

| | | |
|---|---|---|
| DE | 30 47 963 A | 7/1982 |
| DE | 41 04 011 C1 | 2/1992 |
| DE | 197 01 873.4 | 1/1997 |
| EP | 1 060 932 A | 12/2000 |
| JP | 2000213430 A * | 8/2000 |
| JP | 2004106652 A * | 4/2004 |

* cited by examiner

Primary Examiner—Willis R. Wolfe, Jr.
(74) Attorney, Agent, or Firm—Klaus J. Bach

(57) ABSTRACT

In an internal combustion engine for a motor vehicle having a support for supporting the internal combustion engine and a system for routing fresh gas and exhaust gas to and from the engine, a mixing valve of an exhaust gas recirculation system is integrated in the support of the engine.

4 Claims, 1 Drawing Sheet

INTERNAL COMBUSTION ENGINE FOR A MOTOR VEHICLE

This is a Continuation-In-Part Application of international application PCT/EP03/01953 filed Feb. 26, 2003 and claiming the priority of German application 102 09 167.6 filed Mar. 1, 2002.

BACKGROUND OF THE INVENTION

The invention relates to an internal combustion engine for a motor vehicle having an engine support structure and a fresh gas intake and exhaust gas discharge system.

DE 30 47 963 A1 discloses an engine support for an internal combustion engine in a motor vehicle with front-wheel drive, in which an exhaust system forms the engine support. The exhaust system is secured on one side to the cylinder head of the internal combustion engine and on the other side to a vehicle-side, elastic bearing, and absorbs forces and moments about the longitudinal axis of the engine, which is oriented in the transverse direction of the vehicle with a transversely fitted internal combustion engine.

It is an object of the invention to provide a space-saving arrangement of an engine bracket for an internal combustion engine in a motor vehicle which is independent of the way in which the internal combustion engine is fitted, and includes an exhaust gas recirculation system.

SUMMARY OF THE INVENTION

In an internal combustion engine for a motor vehicle having a support for supporting the internal combustion engine and a system for routing fresh gas and exhaust gas to and from the engine, a mixing valve of an exhaust gas recirculation system is integrated in the support of the engine.

An internal combustion engine is supported at least at three locations in the motor vehicle by means of what is known as an engine support. These engine supports bear the weight of the internal combustion engine and accommodate the torque generated by the internal combustion engine against the motor vehicle. The engine supports are secured rigidly to the internal combustion engine and, via rubber elements, to the motor vehicle. To transmit the high loads from the internal combustion engine to the vehicle and at the same time to be light-weight, the engine supports generally form a casing-like component which has a large volume and therefore take up relatively large amounts of space to the side of, and below, the internal combustion engine. To utilize this volume in accordance with the invention, a mixing valve of an exhaust gas recirculation system, which is likewise arranged laterally with respect to the internal combustion engine and has a relatively large volume, is integrated in the engine support.

The integration of the mixing valve of the exhaust gas recirculation system in a hollow space in the engine support does not result in any drawbacks in terms of reduced rigidity of the engine support but makes good use of the hollow space itself.

In a particular configuration of the invention, the mixing valve and the engine support are designed as a single piece, thereby obviating the need to secure the two components to one another, while at the same time reducing the weight, since double wall thicknesses are no longer required.

In a further advantageous configuration of the invention, connection pieces for an exhaust gas recirculation line are provided on the support/exhaust gas recirculation mixing valve assembly. This can be achieved, for example, by integrally casting the connection pieces with the support.

Further features and combinations of features will become apparent from the following description on the basis of the accompanying drawings. A specific exemplary embodiment of the invention is illustrated in simplified form in the drawings and is explained in more detail in the description.

BRIEF DESCRIPTION OF THE DRAWINGS

The sole FIGURE diagrammatically depicts an internal combustion engine in a motor vehicle.

DESCRIPTION OF A PREFERRED EMBODIMENT

Figure 1:
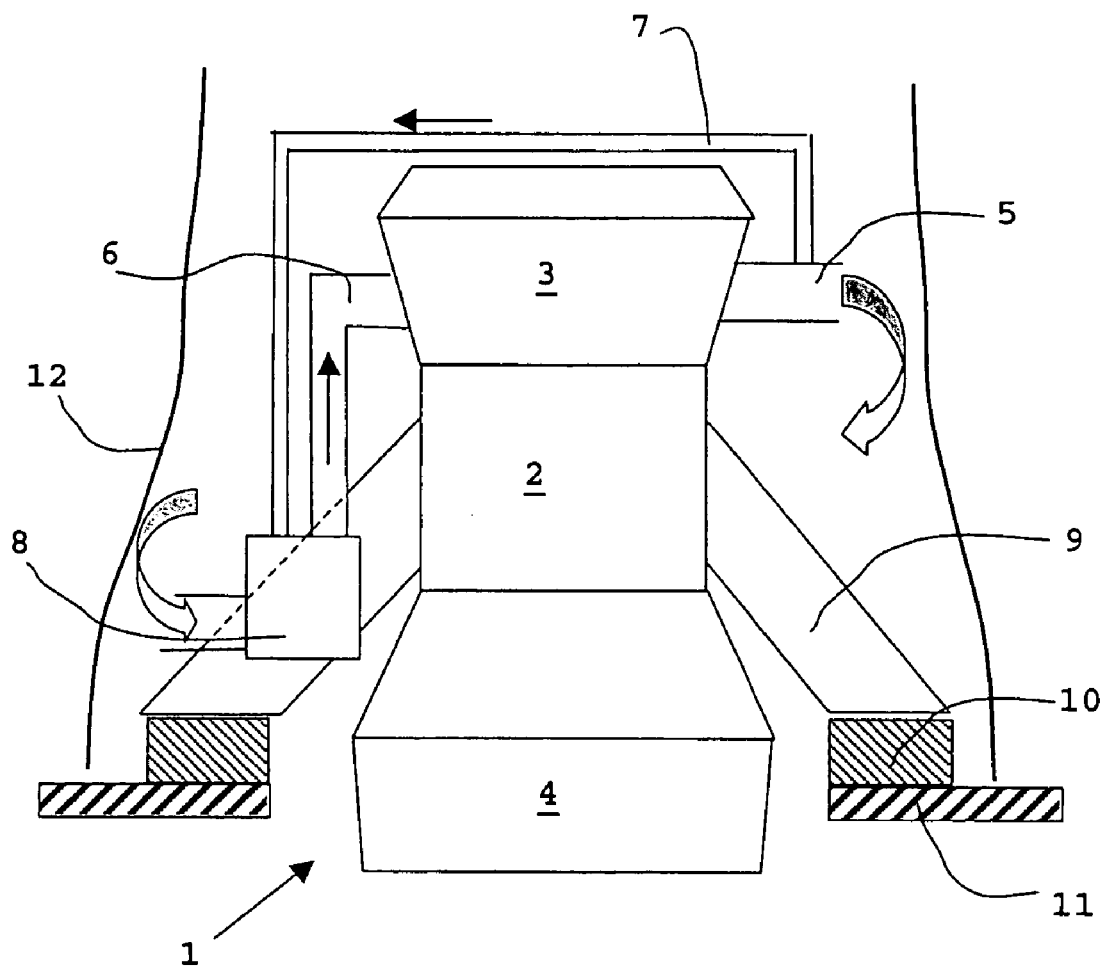

An internal combustion engine 1 comprising a cylinder block 2, a cylinder head 3 and an oil sump 4, has an exhaust manifold 5 and an induction system 6. Some of the exhaust gas in the exhaust manifold 5 is returned to the induction system 6 via the exhaust gas recirculation line 7 and the mixing valve 8. For space reasons, it is advantageous for the induction system 6 to be arranged close to the engine.

The internal combustion engine 1 is secured to frame parts 11 of the motor vehicle via two supports 9 and two rubber bearings 10. The frame parts 11 are parts of a vehicle sub-frame or frame (not shown in more detail). Two walls 12, which form the lateral boundary of the engine compartment in the motor vehicle, for example the wheel-well inner panels, are shown to the sides of the internal combustion engine 1.

For vibration reasons, but also on account of the space available, the position of the supports 9 is fixed in the lateral longitudinal structure of the internal combustion engine 1. If the air intake is at a low level, for example from a charge-air cooler (not shown), it is advantageous for the mixing valve 8 which admixes the exhaust gas from the exhaust gas recirculation line 7 to the fresh air in the induction system 6, to be integrated into the support 9. This represents a simple solution to the problem of space in the very limited area between the internal combustion engine 1 and the delimiting walls 12, where also the two large volume support components 9 and the mixing valve 8 have to be accommodated. In addition, use is made of the hollow space in the casing-like support 9. In the case of a support 9, it is advantageous for the mixing valve 9 to be cast integrally with the connection pieces, taking into account the space requirements.

What is claimed is:

1. An internal combustion engine for a motor vehicle, having a support supporting the internal combustion engine and a system for routing fresh gas and exhaust gas, to and from, the engine, and a mixing valve (8) of an exhaust gas recirculation system being integrated in the support (9).

2. An internal combustion engine as claimed in claim 1, wherein the mixing valve (8) is integrated in a hollow space in the support (9).

3. An internal combustion engine as claimed in claim 2, wherein the mixing valve (8) and the support (9) are designed as a single piece.

4. An internal combustion engine as claimed in claim 2, wherein connection pieces for the exhaust gas recirculation system are provided at the support (9).

\* \* \* \* \*